March 3, 1936. R. H. RUSSELL 2,033,010
PROCESS OF BURNING EMULSIFIED COMPOUNDS
Original Filed Feb. 4, 1930
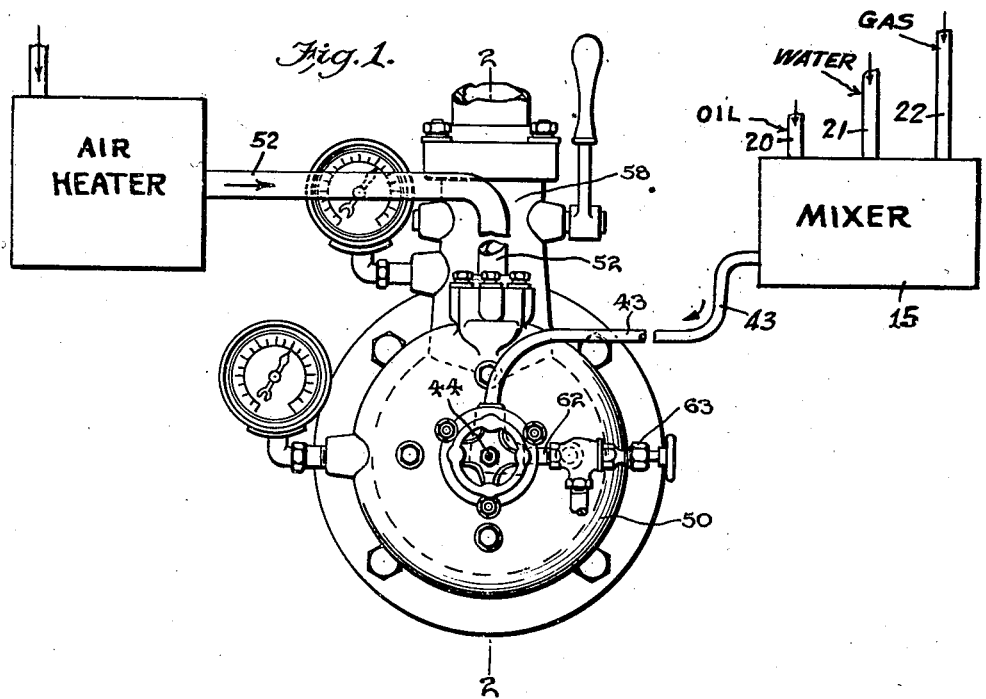
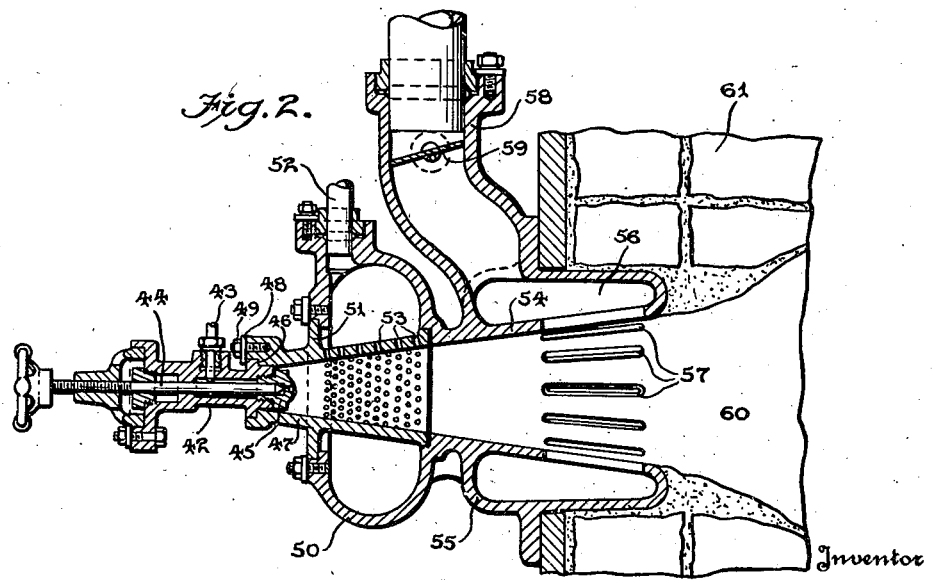
Inventor
R. H. Russell
By Seymour & Dright
Attorneys Patented Mar. 3, 1936

2,033,010

UNITED STATES PATENT OFFICE

2,033,010

PROCESS OF BURNING EMULSIFIED COMPOUNDS

Robert H. Russell, Cleveland, Ohio, assignor to Gas Fuel Corporation, New York, N. Y., a corporation of Delaware Original application February 4, 1930, Serial No. 425,857. Divided and this application March 25, 1931, Serial No. 525,293

5 Claims. (Cl. 158—117.5)

This invention relates to heating by emulsified compounds including hydrocarbons, and to a novel method and apparatus for burning such compounds. The present application is a division of my application Serial No. 425,857, filed February 4, 1930.

It is well known that at the present time, oil emulsions are generally treated in order to dehydrate the same. The dehydration methods may be classified into six groups as follows: 1, gravity settling; 2, heat treatment; 3, electrical treatment; 4, chemical treatment; 5, centrifugal treatment; and 6, filtration. It has been found necessary to treat emulsified oils by such methods before subjecting the oil to refining processes.

I have found that in processing relatively heavy oils, for instance, low grade and low specific gravity hydrocarbons, such as heavy crude petroleum, oil field emulsions, still bottoms and the like, it is advantageous to thoroughly mix the same with aqueous fluids, providing the mixture is admixed with a gaseous agent such as air, $CO_2$ or the like. For example, I have discovered that if heavy hydrocarbons, water and a suitable gas are thoroughly agitated in the presence of one another under superatmospheric pressure, that a compound will result, in which each globule of gas or other elastic fluid is coated with a film of water arranged within a film or coating of the oil, and this compound will remain in such condition indefinitely, so that it may be immediately or subsequently used for fuel purposes.

The primary object of the invention is to provide a process in which still bottoms or the like are employed in the manufacture of a compound, particularly suitable for fuel purposes, this compound being mixed with preheated air or its equivalent under pressure, and also with steam if desired, and the mixture being burned.

With the foregoing object outlined and with other objects in view which will appear as the description proceeds, the invention consists in the novel features hereinafter described, in detail, illustrated in the accompanying drawing, and more particularly pointed out in the appended claims.

Referring to the drawing,

Fig. 1 is an end view of an apparatus designed for gasifying and causing the combustion of the emulsified fuel. In this view the mixer for making the emulsified compound and the primary air heater are shown diagrammatically.

Fig. 2 is a vertical sectional view of a portion of said apparatus taken on the line 2—2 of Fig. 1.

An apparatus employed for producing emulsified compounds of the type used in the present invention is fully disclosed in the above-mentioned parent application Serial No. 425,857 and is diagrammatically shown in Fig. 1 of the present application. It comprises a closed chamber 15 capable of withstanding relatively high superatmospheric pressure. In accordance with this invention, for example, low grade and low specific gravity hydrocarbons, such as heavy crude petroleum, oil filled emulsions, still bottoms, and the like, which are ordinarily unsuitable or uneconomical for use as fuels or refining, are introduced into the casing through a pipe 20, along with water at 21 and a suitable gas, such as air at 22. The interior of the casing is provided with agitating blades or arms (not shown) for violently stirring or beating these fluids within the casing.

If the mixing process is carried on as a batch operation, a suitable quantity of compressed air or other suitable gas is introduced into the casing at 23 and after the desired proportions of oil, aqueous liquid and gas are introduced the blades are moved to violently agitate the contents of the casing, so as to force the constituents of the compound to coalesce and tenaciously adhere to one another. Under the microscope it has been found that the gas, such as air, due to the agitation, will disperse and form globules or bubbles, each one of which will be coated with a film of water contained within a skin of oil, and it has been found that a compound of this nature will remain in the foamy condition indefinitely. Actually, such a compound has remained in stable condition for a period of more than a year without any noticeable stratification.

The amounts of air and water used in the compound manufacturing phase of the invention, will vary and depend on the characteristics of the oil processed.

I may also mix the constituents continuously instead of by batch treatment.

I may state however, that in operating the agitator, whether for the batch or continuous process, the oil, water and gas should be introduced in proper proportions, and in the casing should be operated upon under pressure to produce the compound which may be subsequently used as fuel.

This compound may be consumed in a burner of the type shown in the drawing. This burner comprises a tubular member 42 into which the compound is introduced under pressure by way of a pipe 43. The discharge of the compound from the tubular member is regulated by a needle valve 44 which cooperates with a valve seat 45.

A flange 46 on the tubular member, fits in an annular seat at the outer end of a flared member 47, and is secured to this seat in a gas-tight manner, by any suitable means, such as washers 48 on bolts 49.

The flared member 47 in which the compound expands, extends into a housing 50 and its intermediate portion has an annular flange 51 that is secured in an opening in the housing by any suitable means, in such manner as to prevent passage of gas past the joint.

As the compound passes through the member 47, it is mixed with highly heated primary air which enters the housing under pressure by way of pipe 52, and passes through ports 53 into the flared member. This primary air may be heated to any suitable degree, but I prefer to have it at a temperature of from 800 to 1000° F. at the time it mixes with the compound, as I have found that at such temperatures, the desired result is obtained.

As the highly heated mixture of air and compound discharges from the member 47, it enters the flared throat 54 of a secondary air housing 55, which is provided with an annular chamber 56, from which the air flows through slots 57 into the throat 54. The secondary air is also preferably heated and enters the housing 55 by way of a conduit 58 which is preferably provided with a damper 59 to control the amount of the secondary air entering the burner.

The mixture of primary air, compound and secondary air is discharged from the throat 54 in highly heated condition, and may be consumed in any suitable means, such as the fire box 60 of a furnace 61.

As an example of the economy to be obtained by proceeding in accordance with the processes described in connection with the drawing, I may state that at the present time the fuel oil which is burned in furnaces costs $1.35 a barrel. I can obtain as good or better results with a lower grade of oil costing about 75¢ a barrel, due to the fact that this oil is first incorporated in the compound which enables it to be readily converted to a gas and burned when mixed with air or the equivalent thereof.

In closing down the furnace, it is advisable to pass steam through the tubular member 42, and the valve seat 45 to clear the apparatus of the compound and thus prevent carbonization and for such purpose, I provide the member 42 with a steam supply pipe 62, having a control valve 63.

For the purpose of producing a fuel, by way of repetition, it may be stated briefly that heavy crude petroleum, still bottoms or like hydrocarbons, and water, are pumped into the mixer and thoroughly agitated in the presence of air or any other suitable gas under super-atmospheric pressure, the pressure required depending upon the nature of the hydrocarbons undergoing treatment. Likewise, the amount of water that may be put into the mixture depends upon the character of the hydrocarbons. With particularly heavy hydrocarbons, it will be necessary to preheat the same to increase its fluidity to permit it to be properly handled by the pumps.

Upon proper agitation for a sufficient length of time, the compound is formed, and it is substantially permanent in character, and does not tend to separate.

The compound thus produced may be stored or may be consumed as produced. The compound from the mixer or storage tank is preferably passed through an atomizer pump into the combustion gas generator and burner shown in the drawing. As the atomized compound is expanded in the chamber of the gas producer or the like, it is subjected to an air blast, the air having a temperature of from 800 to 1000° F., although a wide variation of temperature may be used. The air, of course, must be at a pressure in excess of the pressure of the expanded compound. This treatment of the compound produces a practically permanent gas, which contains, due to the breaking up of the water, a large portion of the oxygen necessary to produce complete combustion. This permanent gas is then passed to the burner proper, where additional heated air under pressure, in amount sufficient to produce complete combustion, is admixed with the same.

By "heavy liquid hydrocarbons" in the following claims, I mean low grade and low specific gravity hydrocarbons such as heavy crude petroleum, oil field emulsions, still bottoms and the like. I have found that such heavy liquid hydrocarbons have sufficient strength and tenacity to maintain the globule condition over extended periods of time.

While I have disclosed the principle of my invention, as well as my method and apparatus in such manner that they may be readily understood by those skilled in the art, I am aware that changes may be made in the details disclosed, without departing from the spirit of the invention, as expressed in the claims.

What I claim and desire to secure by Letters Patent, is:—

1. In a process for burning an emulsified compound comprising an aqueous liquid, a heavy hydrocarbon liquid and a gas under superatmospheric pressure, substantially permanent in character and in which the components do not tend to separate, the steps of expanding said compound, and mixing the compound while it is expanding with a combustion-supporting gas while the latter is under superatmospheric pressure and at a temperature above 800° F.

2. In a process for burning an emulsified compound comprising an aqueous liquid, a heavy hydrocarbon liquid and a gas under superatmospheric pressure, substantially permanent in character and in which the components do not tend to separate, the steps of expanding said compound, and mixing said compound while it is expanding with highly heated air at a temperature above 800° F.

3. In a process for burning an emulsified compound comprising an aqueous liquid, a heavy hydrocarbon liquid and a gas under superatmospheric pressure substantially permanent in character and in which the components do not tend to separate, the steps of expanding said compound, and mixing said compound while it is expanding with heated air at a temperature between 800° to 1000° F.

4. In a process for burning an emulsified compound comprising an aqueous liquid, a heavy hydrocarbon liquid and a gas under superatmospheric pressure, substantially permanent in character and in which the components do not tend to separate, mixing said compound with a primary combustion-supporting gas heated above 800° F., expanding the mixture, and then admixing a secondary combustion-supporting gas with the expanding mixture.

5. In a process of the character described, producing a substantially permanent emulsified compound comprising a multiplicity of minute gas globules surrounded by films of water and heavy hydrocarbon oil in the order named, mixing said compound with a combustion-supporting gas heated to above 800° F., and then burning the mixture.

ROBERT H. RUSSELL.